US012636888B2

(12) United States Patent
Nakajima

(10) Patent No.: US 12,636,888 B2
(45) Date of Patent: May 26, 2026

(54) IMAGE FORMING DEVICE AND METHOD OF CONTROLLING IMAGE FORMING DEVICE

(71) Applicant: SEIKO EPSON CORPORATION, Tokyo (JP)

(72) Inventor: Norihiko Nakajima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 131 days.

(21) Appl. No.: 18/443,410

(22) Filed: Feb. 16, 2024

(65) Prior Publication Data

US 2024/0278577 A1 Aug. 22, 2024

(30) Foreign Application Priority Data

Feb. 17, 2023 (JP) ................................ 2023-023307

(51) Int. Cl.
*B41J 2/165* (2006.01)

(52) U.S. Cl.
CPC ....... *B41J 2/16579* (2013.01); *B41J 2/16517* (2013.01); *B41J 2002/16573* (2013.01)

(58) Field of Classification Search
CPC ................ B41J 2/16579; B41J 2/16517; B41J 2002/16573
See application file for complete search history.

(56) References Cited

U.S. PATENT DOCUMENTS

2021/0086517 A1* 3/2021 Nakano .................. B41J 2/0451
2021/0178752 A1* 6/2021 Johnson ................. B41J 2/0451
2023/0311513 A1* 10/2023 Kanamura ........... B41J 2/16532 347/22

FOREIGN PATENT DOCUMENTS

CN 110949011 B * 8/2021 ............ B41J 2/0451
JP 2006168150 A * 6/2006
JP 2010005907 A * 1/2010

* cited by examiner

*Primary Examiner* — Sharon Polk
(74) *Attorney, Agent, or Firm* — CHIP LAW GROUP

(57) ABSTRACT

An image forming device including an ink jet head includes a detection unit that detects a degree of nozzle clogging of the ink jet head, a first determination unit that determines a type of cleaning of the ink jet head, the type of the cleaning having different execution periods based on the degree of the nozzle clogging detected by the detection unit, an acquisition unit that acquires a user's usage tendency of the image forming device, and a second determination unit that determines an execution clock time of the cleaning to be performed next time based on the type of cleaning determined by the first determination unit and the usage tendency acquired by the acquisition unit.

6 Claims, 3 Drawing Sheets

IMAGE FORMING DEVICE AND METHOD OF CONTROLLING IMAGE FORMING DEVICE

The present application is based on, and claims priority from JP Application Serial Number 2023-023307, filed Feb. 17, 2023, the disclosure of which is hereby incorporated by reference herein in its entirety.

BACKGROUND

1. Technical Field

The present disclosure relates to an image forming device and a method of controlling the image forming device.

2. Related Art

In the related art, an image forming device that cleans an ink jet head is known. For example, JP-A-2010-005907 discloses an image recording device that adjusts the timing of print head cleaning to a time zone in which the image recording device is not used by the user.

However, in JP-A-2010-005907 can make it possible to perform cleaning while avoiding the user's usage time zone, but does not take into account the fact that the time required for cleaning differs depending on the print head condition, so that there is room for improvement in optimization of the cleaning execution clock time.

SUMMARY

According to an aspect of the present disclosure, in an image forming device including an ink jet head, the image forming device includes a detection unit that detects a degree of nozzle clogging of the ink jet head, a first determination unit that determines a type of cleaning of the ink jet head, the type of the cleaning having different execution periods based on the degree of the nozzle clogging detected by the detection unit, an acquisition unit that acquires a user's usage tendency of the image forming device, and a second determination unit that determines an execution clock time of the cleaning to be performed next time based on the type of the cleaning determined by the first determination unit and the usage tendency acquired by the acquisition unit.

According to an aspect of the present disclosure, in a method of controlling an image forming device including an ink jet head, the method includes detecting a degree of nozzle clogging of the ink jet head, determining a type of cleaning of the ink jet head, the type of the cleaning having different execution periods based on the detected degree of the nozzle clogging, acquiring a user's usage tendency of the image forming device, and determining an execution clock time of the cleaning to be performed next time based on the determined type of the cleaning and the acquired usage tendency.

DESCRIPTION OF EMBODIMENTS

1. Configuration of Image Forming Device

Figure 1:
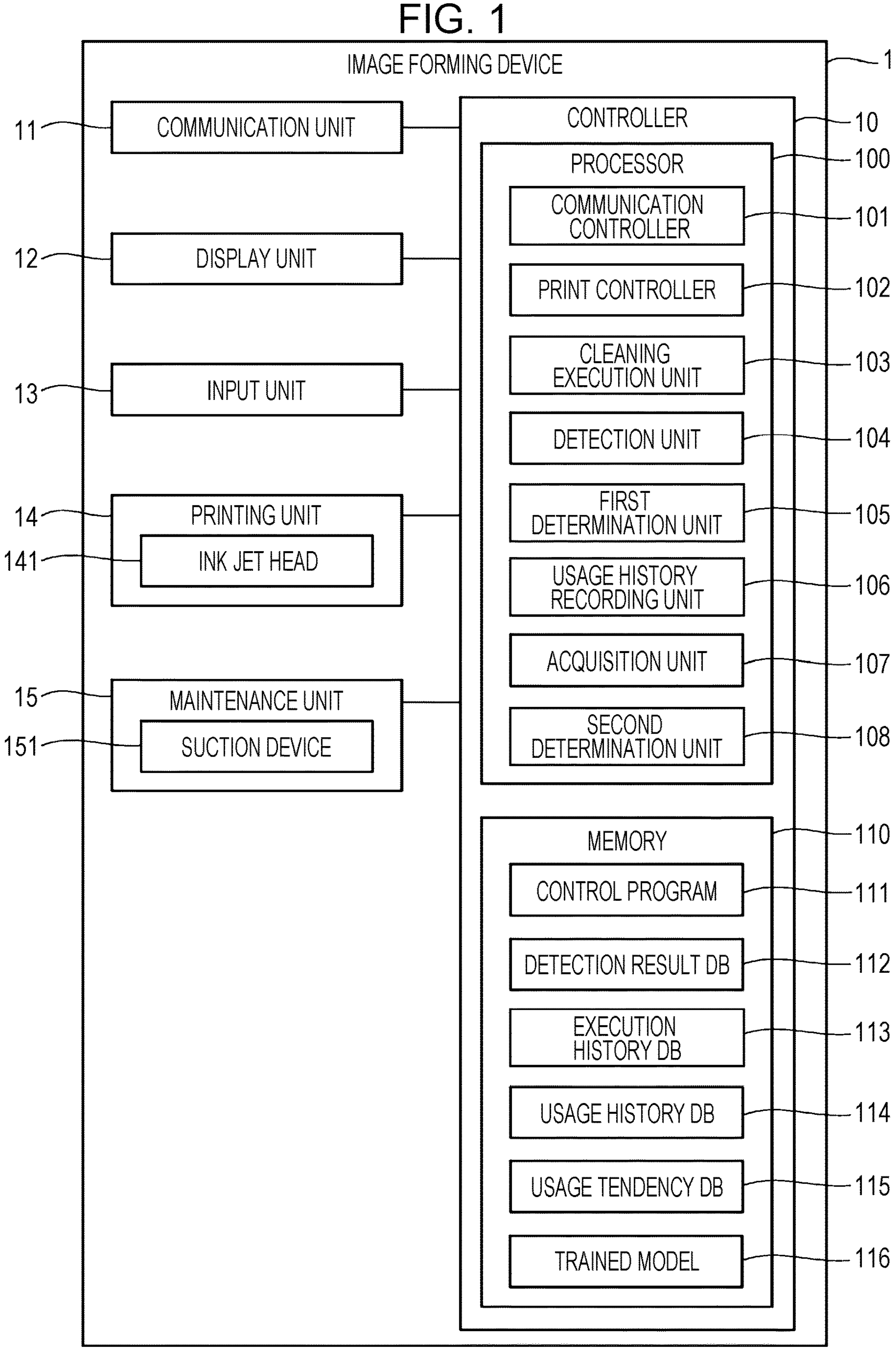
FIG. 1 is a diagram showing the configuration of an image forming device.

FIG. 1 is a diagram showing the configuration of an image forming device 1. The image forming device 1 performs ink jet printing on a print medium. There are no restrictions on the type of print medium, and examples thereof include cut paper of a predetermined size, roll paper, and a sheet made of synthetic resin. An ink jet head 141 included in the image forming device 1 may be of a serial type, a line type, or a lateral type. In addition to the printing function, the image forming device 1 may be able to perform other functions such as a scanning function and a facsimile function.

The image forming device 1 includes a controller 10, a communication unit 11, a display unit 12, an input unit 13, a printing unit 14, and a maintenance unit 15. The controller 10 includes a processor 100 such as a central processing unit (CPU), a memory 110, and an interface circuit for coupling another device, a sensor, and the like, and controls respective units of the image forming device 1. The communication unit 11, the display unit 12, the input unit 13, the printing unit 14, and the maintenance unit 15 are coupled to the controller 10.

The memory 110 is a storage device that stores programs and data. The memory 110 stores a control program 111, a detection result DB (database) 112, an execution history DB 113, a usage history DB 114, a usage tendency DB 115, a trained model 116, and another piece of data processed by the processor 100. Memory 110 has a non-volatile storage area. Further, the memory 110 may has a volatile storage area and constitute a work area of the processor 100. The memory 110 is configured by, for example, a read only memory (ROM) and a random access memory (RAM). The execution history DB 113 is an example of a "third storage unit". The usage history DB 114 is an example of a "first storage unit". The usage tendency DB 115 is an example of a "second storage unit". These databases will be described later.

The communication unit 11 includes communication hardware such as a communication circuit, and communicates with an external personal computer (PC) under the control of the controller 10. For example, the communication unit 11 receives image data, print data, and the like from the external PC. Note that the print data is data that includes a control command conforming to the command system of the image forming device 1 and image data, and instructs printing of the image indicated by the image data. The communication standard of the communication unit 11 may be a wireless communication standard or a wired communication standard.

The display unit 12 includes a plurality of LEDs, a display panel, and the like, and under the control of the controller 10, turns on, turns off, or blinks the LEDs in a predetermined manner, and displays information with the display panel.

The input unit 13 includes an operation switch provided on the housing of the image forming device 1, detects an operation on the operation switch, and outputs a signal indicating the detected operation to the image forming device 1. The controller 10 executes processing corresponding to the operation in response to input from the input unit 13.

The printing unit 14 includes a configuration related to the ink jet head 141 that ejects the ink onto a print medium to form dots, a carriage that moves the ink jet head 141 in the scanning direction, a carriage drive motor that drives the carriage, a transport mechanism that transports the print medium, a supply mechanism that supplies the ink to the ink jet head 141, and the like. The printing unit 14 prints an image on a print medium by performing printing under the control of the controller 10.

The maintenance unit 15 includes a suction device 151 that sucks the ink. The suction device 151 is provided at a predetermined location within the image forming device 1. The suction device 151 includes, for example, a head accommodation portion that accommodates the ink jet head 141, a waste ink tank that stores waste ink, a tube that couples the head accommodation portion and the waste ink tank, and a pump that sucks the ink from the ink jet head 141 accommodated in the head accommodation portion.

By reading and executing the control program 111, the processor 100 functions as a communication controller 101, a print controller 102, a cleaning execution unit 103, a detection unit 104, a first determination unit 105, a usage history recording unit 106, an acquisition unit 107, and a second determination unit 108.

The communication controller 101 communicates with an external PC via the communication unit 11.

The print controller 102 causes the printing unit 14 to perform printing.

The cleaning execution unit 103 causes the maintenance unit 15 to clean the ink jet head 141. The cleaning is an operation that forcibly sucks the ink stored in the nozzle cavity. The cleaning can suppress the occurrence of an ejection failure in the nozzles due to the increase in viscosity of the ink stored in the cavity of the nozzle of the ink jet head 141 over time. Further, the cleaning can improve an ejection failure that occur in the nozzle.

The cleaning execution unit 103 moves the ink jet head 141 to the suction device 151 and stores the ink jet head 141 in the head accommodation portion. Next, the cleaning execution unit 103 drives the pump. As the pump is driven, air is sucked out from the head accommodation portion, and negative pressure is applied to each nozzle of the ink jet head 141. The ink stored in the cavity of the nozzle is forcibly sucked out from the nozzle and stored in the waste ink tank as waste ink.

There is a plurality of types of cleaning that the cleaning execution unit 103 performs. In the present embodiment, there are three types of cleaning that the cleaning execution unit 103 performs: first cleaning, second cleaning, and third cleaning. The first cleaning takes a shorter execution period than the second cleaning and the third cleaning. Therefore, the first cleaning has a lower effect of suppressing the occurrence of an ejection failure and a lower effect of improving an ejection failure than the second cleaning and the third cleaning. The second cleaning takes a longer execution period than the first cleaning and takes a shorter execution period than the third cleaning. Therefore, the second cleaning has a lower effect of suppressing the occurrence of an ejection failure and improving the ejection failure than the third cleaning, but has a higher effect of suppressing the occurrence of an ejection failure and improving the ejection failure than the first cleaning. The third cleaning takes a longer execution period than the first cleaning and the second cleaning. Therefore, the third cleaning has a higher effect of suppressing the occurrence of an ejection failure and a higher effect of improving an ejection failure than the first cleaning and the second cleaning.

The cleaning execution unit 103 performs cleaning according to the cleaning execution clock time determined by the second determination unit 108, which will be described later. The cleaning execution clock time includes a time when cleaning starts and a time when cleaning ends. When the second determination unit 108 determines the cleaning execution clock time, the cleaning execution unit 103 acquires the determined cleaning execution clock time from the second determination unit 108. Then, the cleaning execution unit 103 performs cleaning according to the acquired cleaning execution clock time.

The cleaning execution unit 103 records the execution history of the most recently performed cleaning in the execution history DB 113 every time the cleaning execution is completed. Here, the execution history DB 113 will be explained. The execution history DB 113 is a database in which cleaning execution histories are recorded in chronological order. The execution history DB 113 records an execution history for each cleaning performed. One execution history recorded in the execution history DB 113 includes a cleaning execution clock time and a type of cleaning performed.

The detection unit 104 detects a degree of nozzle clogging in the ink jet head 141. Note that nozzle clogging indicates that the nozzle has an ejection failure. Further, the degree of nozzle clogging in the ink jet head 141 indicates the degree of how many nozzles out of all the nozzles of the ink jet head 141 has nozzle clogging.

The detection unit 104 detects whether nozzle clogging has occurred for each nozzle, for example, by the following method. The cavity of the nozzle is provided with a vibration plate that changes the volume of the cavity to eject the ink stored in the cavity from the nozzle, and is also provided with an actuator that vibrates the vibration plate. The detection unit 104 detects residual vibration of the vibration plate as a waveform when the ink is ejected from the nozzle. The detection unit 104 sequentially ejects a predetermined amount of ink from each nozzle. The detection unit 104 detects the waveform of residual vibration of the vibration plate when a predetermined amount of ink is ejected from one nozzle. Next, the detection unit 104 analyzes the detected waveform, digitizes the cycle and the amplitude of the waveform, measures a specific vibration of the waveform, and detects whether an ejection failure has occurred in the nozzle based on the measured specific vibration cycle and a comparison with a standard waveform when no ejection failure has occurred.

Note that the method of detecting nozzle clogging is not limited to the method described above, and any method may be used, for example, the following method may be used. The detection unit 104 ejects, from a nozzle, the ink charged in a predetermined method onto a conductive material. The detection unit 104 detects a change in a current state of the conductive material as the ink lands on the conductive material, and determines whether an ejection failure has occurred in the nozzle based on the mode of the change in the current state.

Upon detecting the presence or absence of nozzle clogging for each nozzle, the detection unit 104 detects the degree of nozzle clogging in the ink jet head 141. The detection unit 104 of the present embodiment detects the degree of nozzle clogging as one of “large”, “medium”, “small”, and “non”. A “large” degree of nozzle clogging indicates that nozzle clogging has occurred in nozzles the number of which is equal to or greater than a first threshold value. A “medium” degree of nozzle clogging indicates that nozzle clogging has occurred in nozzles the number of which is less than the first threshold value and equal to or greater than a second threshold value that is less than the first threshold value. A “small” degree of nozzle clogging indicates that nozzle clogging has occurred in nozzles the number of which is less than the second threshold value and equal to or greater than one. A "none" degree of nozzle clogging indicates that no nozzle clogging has occurred in any nozzle.

When detecting the degree of nozzle clogging in the ink jet head 141, the detection unit 104 records the detection result in the detection result DB 112. Here, the detection result DB 112 will be explained. The detection result DB 112 is a database in which the detection results of the detection unit 104 are recorded. The detection result DB 112 records detection results for each detection of the degree of nozzle clogging. One detection result recorded in the detection result DB 112 includes the time when detection was completed and the degree of nozzle clogging. Note that a plurality of detection results including the latest detection result may be recorded in the detection result DB 112, or only the latest detection result may be recorded.

The first determination unit 105 determines the type of cleaning based on the degree of nozzle clogging detected by the detection unit 104 and the execution history recorded in the execution history DB 113. The first determination unit 105 determines the type of cleaning each time the detection unit 104 detects the degree of nozzle clogging. More specifically, each time the detection unit 104 records a detection result in the detection result DB 112, the first determination unit 105 reads the latest detection result from the detection result DB 112, and also reads the latest cleaning execution history from the execution history DB 113. Then, the first determination unit 105 determines the type of cleaning based on the degree of nozzle clogging indicated by the read detection result and the read execution history.

For example, it is assumed that the read detection result indicates a "small" degree of nozzle clogging, and the read execution history indicates the first cleaning as the type of cleaning. In the example, the first determination unit 105 determines that the type of cleaning to be performed next time is the second cleaning or the third cleaning. Further, for example, it is assumed that the read detection result indicates a "medium" degree of nozzle clogging, and the read execution history indicates the first cleaning or the second cleaning as the type of cleaning. In the example, the first determination unit 105 determines that the type of cleaning to be performed next time is the third cleaning. Further, for example, it is assumed that the read detection result indicates a "large" degree of nozzle clogging, and the read execution history indicates one of the three types of cleaning. In the example, the first determination unit 105 determines that the type of cleaning to be performed next time is the third cleaning. Further, for example, it is assumed that the read detection result indicates a "non" degree of nozzle clogging, and the read execution history indicates one of the three types of cleaning. In the example, the first determination unit 105 determines that the type of cleaning to be performed next time is the first cleaning.

The usage history recording unit 106 records the usage history of the image forming device 1 by the user in the usage history DB 114. For example, when the image forming device 1 performs printing, the usage history recording unit 106 records the time when printing started and the time when printing ended in the usage history DB 114 as the usage history. For example, when the input unit 13 detects an operation, the usage history recording unit 106 records the time when the process corresponding to the operation started and the time when the process corresponding to the operation ended in the usage history DB 114 as the usage history.

The acquisition unit 107 acquires a usage tendency of the image forming device 1 by the user. The usage tendency of the image forming device 1 indicates a tendency of use of the image forming device 1. In the present embodiment, the usage tendency of the image forming device 1 is such that the usage probability, which is the probability that the image forming device 1 is used in one day, is recorded for each time. Note that the usage tendency of the image forming device 1 may be such that the usage probability may be recorded in units of one hour, the usage probability may be recorded in units of one minute, or the usage probability may be recorded in units of one second. Note that the acquisition unit 107 may acquire a usage tendency of the image forming device 1 at a predetermined cycle, or may acquire a usage tendency of the image forming device 1 every time the detection unit 104 detects the degree of nozzle clogging.

The acquisition unit 107 acquires a usage tendency of the image forming device 1 using the trained model 116. Here, the trained model 116 will be explained. The trained model 116 is a model that is machine trained on the relationship between one day's usage history of the image forming device 1 and the usage tendency of the image forming device 1. Further, the trained model 116 is a model that receives at least one day's usage history of the image forming device 1 and outputs a usage tendency of the image forming device 1 for one day. The trained model 116 is configured as a program that the acquisition unit 107 uses for processing. The trained model 116 includes a model such as a neural network or a support vector machine.

The acquisition unit 107 reads at least one day's usage history from the usage history DB 114. The acquisition unit 107 then inputs the read usage history into the trained model 116 and causes the trained model 116 to output the usage tendency of the image forming device 1, thereby acquiring the usage tendency of the image forming device 1. Upon acquiring the usage tendency of the image forming device 1, the acquisition unit 107 records the acquired usage tendency of the image forming device 1 in the usage tendency DB 115. Here, the usage tendency DB 115 will be explained. The usage tendency DB 115 is a database in which the usage tendency of the image forming device 1 acquired by the acquisition unit 107 is recorded. Note that the usage tendency DB 115 may record a plurality of usage tendencies including the recently acquired usage tendency of the image forming device 1, or may record only the recently acquired usage tendency of the image forming device 1.

The second determination unit 108 determines the execution clock time of the cleaning to be performed next time. The second determination unit 108 reads the usage tendency of the image forming device 1 recently acquired by the acquisition unit 107 from the usage tendency DB 115 when determining the cleaning execution clock time. Then, the second determination unit 108 determines the cleaning execution clock time based on the type of cleaning determined by the first determination unit 105 and the read usage tendency of the image forming device 1.

Figure 2:
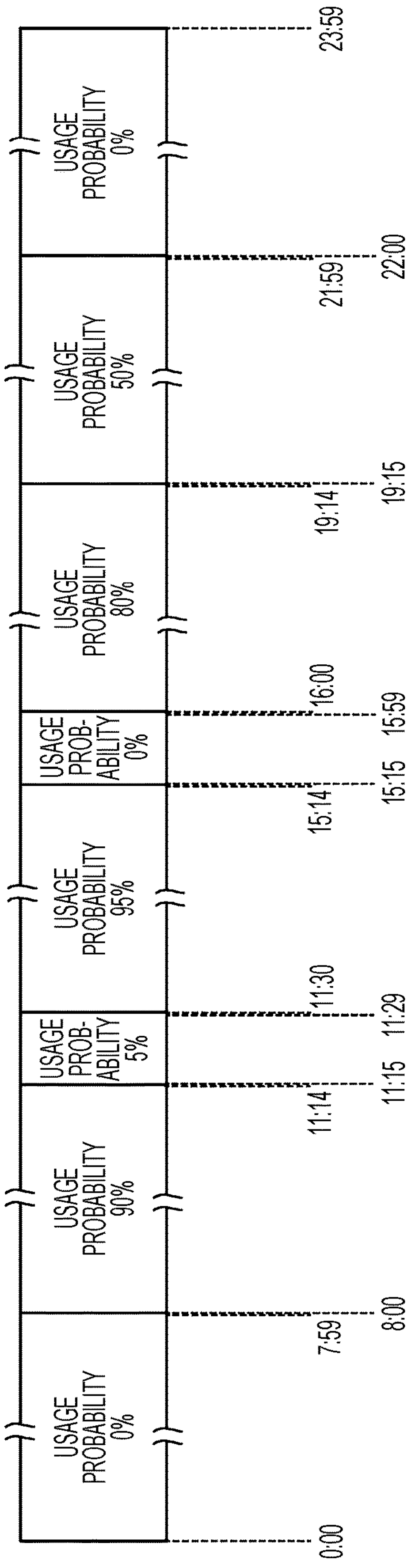
FIG. 2 is a diagram for explaining determination by a second determination unit.

The determination by the second determination unit 108 will be described in detail with reference to FIG. 2. FIG. 2 is a diagram for explaining the determination by the second determination unit 108.

FIG. 2 shows an example of the usage tendency of the image forming device 1. The usage tendency of the image forming device 1 shown in FIG. 2 indicates that the usage probability is 0% from 22:00 to 7:59. Further, the usage tendency of the image forming device 1 shown in FIG. 2 indicates that the usage probability is 90% from 8:00 to 11:14. Further, the usage tendency of the image forming device 1 shown in FIG. 2 indicates that the usage probability is 5% from 11:15 to 11:29. Further, the usage tendency of the image forming device 1 shown in FIG. 2 indicates that the usage probability is 95% from 11:30 to 15:14. Further, the usage tendency of the image forming device 1 shown in FIG. 2 indicates that the usage probability is 0% from 15:15 to 15:59. Further, the usage tendency of the image forming device 1 shown in FIG. 2 indicates that the usage probability is 80% from 16:00 to 19:14. Further, the usage tendency of the image forming device 1 shown in FIG. 2 indicates that the usage probability is 50% from 19:15 to 21:59.

Hereinafter, with reference to FIG. 2, assuming that the execution period of the first cleaning is 10 minutes, the execution period of the second cleaning is 20 minutes, and the execution period of the third cleaning is 30 minutes, the determination by the second determination unit 108 will be explained in detail by giving an example. Note that these execution periods are just examples, and the execution periods of cleaning are not limited to the above mentioned times.

Example 1

In Example 1, a case is illustrated in which the first determination unit 105 determines that the type of cleaning is the first cleaning, and the usage tendency read from the usage tendency DB 115 is the usage tendency shown in FIG. 2. In Example 1, the second determination unit 108 identifies a time zone in which a state in which the usage probability is less than or equal to a predetermined probability continues for 10 minutes or more. Here, the predetermined probability is, for example, 5%. Note that the predetermined probability is not limited to 5%, and may be less than 5% or greater than 5%. In the case of Example 1, the second determination unit 108 identifies a time zone from 22:00 to 7:59, a time zone from 11:15 to 11:29, and a time zone from 15:15 to 15:59 as time zones in each of which a state in which the usage probability is less than or equal to a predetermined probability continues for 10 minutes or more. Next, the second determination unit 108 identifies one time zone that comes earliest from the current time from among the identified time zones. In the case of Example 1, for example, when the current time is 9:00, the second determination unit 108 identifies the time zone from 11:15 to 11:29. Next, the second determination unit 108 determines the cleaning execution clock time so that the cleaning starts and ends during the identified time zone. In the case of Example 1, for example, when the time zone from 11:15 to 11:29 is identified, the second determination unit 108 determines the cleaning execution clock time so that the time at which the cleaning starts is in the range from 11:15 to 11:19, and the time at which the cleaning ends is in the range from 11:25 to 11:29.

Example 2

In Example 2, a case is illustrated in which the first determination unit 105 determines that the type of cleaning is the second cleaning, and the usage tendency read from the usage tendency DB 115 is the usage tendency shown in FIG. 2. In Example 2, the second determination unit 108 identifies a time zone in which a state in which the usage probability is less than or equal to a predetermined probability continues for 20 minutes or more. In the case of Example 2, the second determination unit 108 identifies a time zone from 22:00 to 7:59 and a time zone from 15:15 to 15:59 as time zones in each of which a state in which the usage probability is less than or equal to the predetermined probability continues for 20 minutes or more. Next, the second determination unit 108 identifies one time zone that comes earliest from the current time from among the identified time zones. In the case of Example 2, for example, when the current time is 9:00, the second determination unit 108 identifies the time zone from 15:15 to 15:59. Next, the second determination unit 108 determines the cleaning execution clock time so that the cleaning starts and ends during the identified time zone. In the case of Example 2, for example, when the time zone from 15:15 to 15:59 is identified, the second determination unit 108 determines the cleaning execution clock time so that the time at which the cleaning starts is in the range from 15:15 to 15:39, and the time at which the cleaning ends is within the range of 15:25 to 15:59.

Example 3

Example 3 exemplifies a case where the first determination unit 105 determines that the type of cleaning is the third cleaning, and the usage tendency read from the usage tendency DB 115 is the usage tendency shown in FIG. 2. In Example 3, the second determination unit 108 identifies a time zone in which a state in which the usage probability is less than or equal to a predetermined probability continues for 30 minutes or more. In the case of Example 3, the second determination unit 108 identifies a time zone from 22:00 to 7:59 as a time zone in which the usage probability is less than or equal to the predetermined probability continues for 30 minutes or more. Next, the second determination unit 108 determines the cleaning execution clock time so that the time at which the cleaning stars is in the range of 22:00 to 7:29, and the cleaning ends is in the range of 22:30 to 7:59.

After determining the cleaning execution clock time, the second determination unit 108 outputs the determined cleaning execution clock time to the cleaning execution unit 103.

2. Operation of Printing Apparatus

Figure 3:
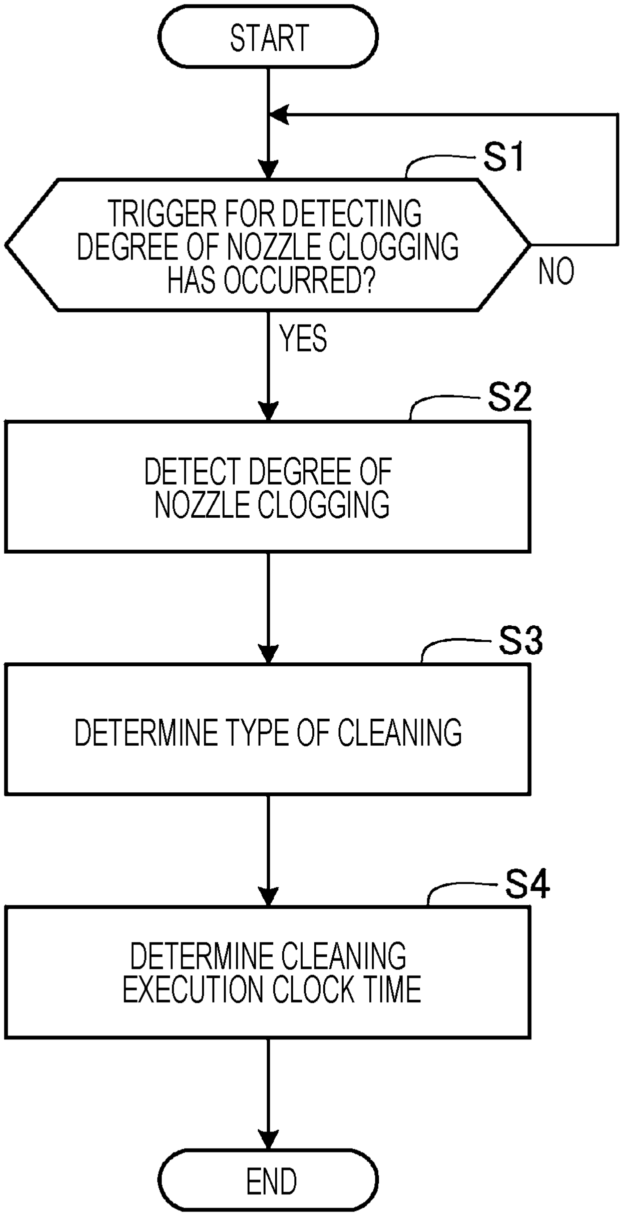
FIG. 3 is a flowchart showing the operation of the image forming device.

FIG. 3 is a flowchart showing the operation of the printing apparatus.

The detection unit 104 determines whether a trigger for detecting the degree of nozzle clogging has occurred (step S1). Examples of the trigger include a predetermined period of time having passed since the previous detection of the degree of nozzle clogging, an instruction to start printing having been received from the PC, and printing having ended.

When it is determined that a trigger for detecting the degree of nozzle clogging has occurred (step S1: YES), the detection unit 104 detects the degree of nozzle clogging (step S2).

The first determination unit 105 determines the type of cleaning based on the degree of nozzle clogging detected in step S2 and the execution history recorded in the execution history DB 113 (step S3).

Next, the second determination unit 108 determines the cleaning execution clock time based on the type of cleaning determined in step S2 and the usage tendency of the image forming device 1 recorded in the usage tendency DB 115 (step S4).

As described above, the image forming device 1 determines the cleaning execution clock time in consideration of the usage tendency of the image forming device 1 by the user and the situation of nozzle clogging in the ink jet head 141, so that it is possible to optimize the cleaning execution clock time. Furthermore, since the image forming device 1 can suppress execution of cleaning while the user is using the image forming device 1, it is possible to suppress the state in which the user is prevented from using the image forming device 1 due to cleaning. Further, when the degree of nozzle clogging is not large, the image forming device 1 can perform cleaning by utilizing the short period when the image forming device 1 is not used by the user. Furthermore, when the degree of nozzle clogging is large, the image forming device 1 can perform effective cleaning of the ink jet head 141 by selecting a time zone when the user has not used the image forming device 1 for a long time.

3. Other Embodiments

The embodiment described above shows an aspect, and can be modified and applied as desired.

In the embodiment described above, the detection unit 104 detects the degree of nozzle clogging in four stages, but in other embodiments, the detection unit 104 may detect the degree of nozzle clogging in more stages, or may detect the degree of nozzle clogging in three stages including "non".

In the embodiment described above, the case where there are three types of cleaning is described. In other embodiments, more types of cleaning with different execution periods may be performed, or two of the three types described above may be performed.

In the embodiment described above, the acquisition unit 107 uses the trained model 116 to acquire a usage tendency of the image forming device 1. In another embodiment, the acquisition unit 107 may acquire a usage tendency of the image forming device 1 using a statistical method. In the another embodiment, the acquisition unit 107 acquires several days' usage history from the usage history DB 114. Next, based on the acquired usage history, the acquisition unit 107 uses a statistical method to determine the usage probability at each time in units of one hour, one minute, or one second. Then, the acquisition unit 107 acquires each determined usage probability as a usage tendency of the image forming device 1.

In the embodiment described above, the first determination unit 105 determines the type of cleaning based on the degree of nozzle clogging and the cleaning execution history. In another embodiment, the first determination unit 105 may determine the type of cleaning based on the degree of nozzle clogging and a table. The table is data in which the degree of nozzle clogging and the type of cleaning are associated in a matrix, and is stored in the memory 110. In the another embodiment, the first determination unit 105 refers to the table and determines the type of cleaning that corresponds to the degree of nozzle clogging detected by the detection unit 104 as the type of cleaning to be performed next time. In the another embodiment, the detection unit 104 may detect the degree of nozzle clogging after cleaning is performed, and may correct the correspondence between the degree of nozzle clogging and the type of cleaning.

In other embodiments, the functions of the processor 100 may be implemented by a plurality of processors or semiconductor chips.

Each unit of the image forming device 1 shown in FIG. 1 is an example, and is not particularly limited. It is not necessarily required to implement hardware corresponding to respective units, but it is of course possible to construct a configuration in which the functions of the respective units are implemented by executing a program by one processor. Part of the functions implemented by software may be implemented by hardware, or part of the functions implemented by hardware may be implemented by software. In addition, the detailed configuration of other units of the image forming device 1 can be changed in any manner.

The operation step units shown in FIG. 3 are divided in accordance with the main processing contents in order to facilitate understanding of the operations of the image forming device 1. Thus, the present disclosure is not limited by the division method and the name of the processing units. Depending on the processing content, the process may be divided into more steps. One step unit may be divided so as to include more processes. Moreover, the order of the steps may be changed as appropriate.

4. Summary of Present Disclosure

A summary of the present disclosure is appended below.

Supplementary Note 1

An image forming device including an ink jet head, the image forming device including a detection unit that detects a degree of nozzle clogging of the ink jet head, a first determination unit that determines a type of cleaning of the ink jet head, the type of the cleaning having different execution periods based on the degree of the nozzle clogging detected by the detection unit, an acquisition unit that acquires a user's usage tendency of the image forming device, and a second determination unit that determines an execution clock time of the cleaning to be performed next time based on the type of the cleaning determined by the first determination unit and the usage tendency acquired by the acquisition unit.

According to the configuration, the cleaning execution clock time can be determined in consideration of the cleaning execution period depending on the situation of nozzle clogging in the ink jet head, in addition to user's the usage tendency of the image forming device. Therefore, the cleaning execution clock time can be optimized.

Supplementary Note 2

The image forming device according to Supplementary Note 1, wherein the first determination unit determines the type of the cleaning based on the degree of the nozzle clogging detected by the detection unit and a cleaning execution history of the ink jet head.

According to the configuration, since the type of cleaning is determined in consideration of the state of nozzle clogging in the ink jet head and the cleaning execution history, it is possible to determine the type of cleaning to be performed next time as effective cleaning. Therefore, the cleaning execution clock time can be optimized and effective cleaning can be performed.

Supplementary Note 3

The image forming device according to Supplementary Note 1 or 2, further comprising a first storage unit that records a user's usage history of the image forming device, wherein the acquisition unit acquires the usage tendency based on the usage history recorded in the first storage unit.

According to the configuration, it is possible to acquire a usage tendency that appropriately reflect the user's usage mode of the image forming device based on the usage history recorded by the image forming device, so that it is possible to determine the cleaning execution clock time by appropriately considering the user's usage tendency of the image forming device. Therefore, the cleaning execution clock time can be further optimized.

Supplementary Note 4

The image forming device according to Supplementary Note 3, wherein the acquisition unit inputs the usage history recorded in the first storage unit to a trained model that is machine trained on the usage history and the usage tendency to acquire the usage tendency from the trained model.

According to the configuration, since the acquisition unit acquires a usage tendency through the process of inputting usage history to the trained model, the acquisition unit can acquire the accurate usage tendency with low-load processing. Therefore, the cleaning execution clock time can be further optimized and the processing load on the image processing device can be reduced.

Supplementary Note 5

The image forming device according to any one of Supplementary Notes 1 to 4, further including a second storage unit that records the usage tendency acquired by the acquisition unit, wherein the second determination unit determines an execution clock time of the cleaning to be performed next time based on the usage tendency recorded in the second storage unit.

According to the configuration, by using the usage tendency recorded in the second storage unit, the acquisition unit does not need to acquire the usage tendency every time the cleaning execution clock time is determined. Therefore, the cleaning execution clock time can be quickly determined.

Supplementary Note 6

The image forming device according to any one of Supplementary Notes 2 to 5, further comprising a third storage unit that records an execution history of the cleaning, wherein the first determination unit determines the type of the cleaning based on an execution history of the cleaning, the execution history being recorded in the third storage unit.

According to the configuration, by using the cleaning execution history recorded in the third storage unit, it is not necessary to acquire the cleaning execution history from an external device of the image forming device. Therefore, the cleaning execution clock time can be quickly determined.

Supplementary Note 7

The image forming device according to any one of Supplementary Notes 1 to 6, wherein the first determination unit determines the type of the cleaning when the detection unit detects the degree of the nozzle clogging.

According to the configuration, by providing constraints when determining the type of cleaning, it is possible to suppress unnecessary determination of the cleaning execution clock time. Therefore, the cleaning execution clock time can be optimized and the processing load on the image processing device can be reduced.

Supplementary Note 8

A method of controlling an image forming device including an ink jet head, the method including detecting a degree of nozzle clogging of the ink jet head, determining a type of cleaning of the ink jet head, the type of the cleaning having different execution periods based on the detected degree of the nozzle clogging, acquiring a user's usage tendency of the image forming device, and determining an execution clock time of the cleaning to be performed next time based on the determined type of the cleaning and the acquired usage tendency.

According to the configuration, the effects similar to those of the image forming device described in Supplementary Note 1 can be achieved.

What is claimed is:

1. An image forming device including an ink jet head, the image forming device comprising:
- a detection unit that detects a degree of nozzle clogging of the ink jet head;
- a first determination unit that determines a type of cleaning of the ink jet head, the type of the cleaning having different execution periods based on the degree of nozzle clogging detected by the detection unit;
- a first storage unit that records a usage history of the image forming device, wherein the usage history is associated with a user of the image forming device;
- an acquisition unit that:
  - inputs the recorded usage history to a trained model that is machine trained on the recorded usage history and a usage tendency of the image forming device, wherein the usage tendency is associated with the user; and
  - acquires the usage tendency of the image forming device from the trained model; and
- a second determination unit that determines an execution clock time of the cleaning to be performed next time based on the type of the cleaning determined by the first determination unit and the usage tendency acquired by the acquisition unit.

2. The image forming device according to claim 1, wherein
- the first determination unit
- determines the type of the cleaning based on the degree of nozzle clogging detected by the detection unit and a cleaning execution history of the ink jet head.

3. The image forming device according to claim 2, further comprising:
- a second storage unit that records the cleaning execution history, wherein
  - the first determination unit determines the type of the cleaning based on the cleaning execution history recorded in the second storage unit.

4. The image forming device according to claim 1, further comprising:
- a second storage unit that records the usage tendency acquired by the acquisition unit, wherein
  - the second determination unit determines the execution clock time of the cleaning to be performed next time based on the usage tendency recorded in the second storage unit.

5. The image forming device according to claim 1, wherein
- the first determination unit determines the type of the cleaning when the detection unit detects the degree of nozzle clogging.

6. A method of controlling an image forming device including an ink jet head, the method comprising:
- detecting a degree of nozzle clogging of the ink jet head;
- determining a type of cleaning of the ink jet head, the type of the cleaning having different execution periods based on the detected degree of nozzle clogging;
- recording a usage history of the image forming device, wherein the usage history is associated with a user of the image forming device;
- inputting the recorded usage history to a trained model that is machine trained on the recorded usage history and a usage tendency of the image forming device, wherein the usage tendency is associated with the user; and
- acquiring the usage tendency of the image forming device from the trained model; and
- determining an execution clock time of the cleaning to be performed next time based on the determined type of the cleaning and the acquired usage tendency.

* * * * *